United States Patent
Ganapathiappan

(10) Patent No.: US 9,156,956 B2
(45) Date of Patent: Oct. 13, 2015

(54) SURFACE-CROSSLINKED LATEX PARTICULATES

(75) Inventor: Sivapackia Ganapathiappan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 11/701,040

(22) Filed: Jan. 31, 2007

(65) Prior Publication Data

US 2008/0182960 A1 Jul. 31, 2008

(51) Int. Cl.
 *C09D 11/30* (2014.01)
 *C08J 3/24* (2006.01)

(52) U.S. Cl.
 CPC ................ *C08J 3/245* (2013.01); *C09D 11/30* (2013.01); *C08J 2307/02* (2013.01)

(58) Field of Classification Search
 None
 See application file for complete search history.

(56) References Cited

U.S. PATENT DOCUMENTS

| | | | |
|---|---|---|---|
| 3,615,469 A | 10/1971 | Ramp | |
| 4,078,493 A | 3/1978 | Miyamoto | |
| 4,499,212 A * | 2/1985 | Martino | 523/201 |
| 4,665,107 A | 5/1987 | Micale | |
| 5,736,250 A * | 4/1998 | Heeks et al. | 428/447 |
| 5,786,420 A | 7/1998 | Grandhee | |
| 5,814,685 A | 9/1998 | Satake et al. | |
| 5,954,866 A | 9/1999 | Ohta et al. | |
| 5,977,210 A | 11/1999 | Patel et al. | |
| 5,990,202 A | 11/1999 | Nguyen et al. | |
| 6,057,384 A | 5/2000 | Nguyen et al. | |
| 6,184,296 B1 * | 2/2001 | Obrecht et al. | 525/232 |
| 6,239,193 B1 | 5/2001 | Cheng et al. | |
| 6,248,805 B1 | 6/2001 | Nguyen et al. | |
| 6,277,437 B1 | 8/2001 | Helmer et al. | |
| 6,417,249 B1 | 7/2002 | Nguyen et al. | |
| 6,485,874 B1 | 11/2002 | Moffat et al. | |
| 6,613,814 B2 | 9/2003 | Ishizuka et al. | |
| 6,670,410 B2 | 12/2003 | Ishizuka et al. | |
| 6,716,912 B2 * | 4/2004 | Freeman et al. | 524/824 |
| 6,716,949 B2 | 4/2004 | Ganapathiappan | |
| 6,779,882 B2 | 8/2004 | Ungefug et al. | |
| 6,794,425 B1 | 9/2004 | Ellis et al. | |
| 6,858,301 B2 | 2/2005 | Ganapathiappan | |
| 7,157,504 B2 | 1/2007 | Ma et al. | |
| 2004/0018310 A1 * | 1/2004 | Badesha et al. | 427/385.5 |
| 2004/0112525 A1 | 6/2004 | Pereira et al. | |
| 2004/0116596 A1 | 6/2004 | Vincent et al. | |
| 2005/0203211 A1 * | 9/2005 | Gebhard | 523/205 |

OTHER PUBLICATIONS

English translation of JP 2002-121417; Shichiri et al; Apr. 23, 2002.*

* cited by examiner

*Primary Examiner* — Robert C Boyle
(74) *Attorney, Agent, or Firm* — Thorpe, North, Western

(57) ABSTRACT

The present invention is drawn to surface-crosslinked latex particulates, corresponding latex suspensions, ink-jet inks, and methods for making the latex particulates. A latex suspension can include a fluid medium and surface-crosslinked latex particulates. The surface-crosslinked latex particulates can be devoid of substantially all crosslinking below the particulate surface. Such surface-crosslinked latex particulates can be prepared with a plurality of monomers and at least one crosslinking agent.

14 Claims, No Drawings

SURFACE-CROSSLINKED LATEX PARTICULATES

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. While latex particulates have applications in these and other fields, the ink-jet ink imaging application can be used to favorably illustrate unique advantages of the invention. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being said, while latex particulates can improve durability of prints, they undergo severe thermal shear conditions when printed through thermal ink-jet print heads. Moreover those polymers tend to settle out of inks over time and, therefore, often are not stable in many storage conditions. This being the case, there is a continuing need to provide latex particulates having improved stability and durability for printing on a wide variety of media types.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. It should also be noted that while the discussion may focus on a latex suspension, an ink-jet ink, or a method of crosslinking latex particulates, such discussion in one area is applicable to the other areas.

It is noted that, as used in this specification and the appended claims, the singular forms "a," "an," and "the" include plural referents unless the context clearly dictates otherwise.

The term "poly-functional" indicates a compound having a more than one functional group. Poly-functional specifically includes di-functional compounds (e.g. compounds having two functional groups) and tri-functional compounds (three functional groups). Such "poly-functional" groups include many crosslinking agents.

The term "functional group" or "functionalized" can refer to groups that are reactive, such as amino groups, thiol groups, hydroxyl groups, acid groups, etc. These types of groups may or may not be present on latex particulates. In some embodiments, these groups can be capped or blocked for emulsion polymerization, and then uncapped or unblocked after polymerization, e.g., use of photo labile groups can be unblocked using photo energy, use of chemical blocking groups can be unblocked with a chemical additive, etc. Further, "surface reactive group" indicates surface functional group(s), however such distinction is made herein for readability and ease in differentiation between functional groups of the surface of a monomer/polymer and the functional groups of a crosslinking agent.

The term "plurality" indicates more than one. Plurality can be used to indicate as few as two to a much larger number.

As used herein, "liquid vehicle" or "ink vehicle" refers to the fluid in which colorants and/or latex particulates of the present invention can be dispersed (or solvated in the case of dyes) to form a latex dispersion or an ink-jet ink in accordance with embodiments of the present invention. Liquid vehicles are well known in the art, and a wide variety of liquid vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latex particulates and other polymers, UV curable materials, and/or plasticizers, in some embodiments.

"Colorant" can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle and/or in the pigment that utilizes a physical coating to aid the pigment in becoming and/or substantially remaining dispersed in a liquid vehicle.

As used herein, the terms "deform", "deforms", and "deforming" in relation to a latex particulate when printed, indicate the ability of at least a one of the surface-crosslinking bonds of the latex to modify or otherwise alter when printed on a print media. Such deformation may include bond breaking. Additionally or alternatively, such deformation may indicate some chemical interaction with the print media. For example, even though the latex particulates of the present invention are surface-crosslinked, these crosslinking bonds are typically not so rigid that the latex is prohibited from forming a film upon printing on a media substrate.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

With this in mind, it has been recognized that it would be advantageous to develop latex particulates, latex suspensions, and corresponding inks with improved durability and shear stability. Specifically, in the prior art, general crosslinking has been used in preparing latexes. However, though crosslinking can generally improve the shear stability, storage stability, and performance of ink-jet inks, crosslinking is generally conducted during the polymerization process, which produces random crosslinking throughout the latex particulates. As a result of this random crosslinking throughout the particle, ink-jet print durability is often adversely affected. For example, durability of printed images can be significantly improved when the latex polymers used in an ink are not crosslinked at all, as these latexes often readily form films, etc., but such latexes tend to perform poorly in thermal ink-jet architecture, e.g., films are formed within the architecture which diminishes architecture performance. On the other hand, many crosslinked polymers tend to have a higher glass transition temperature which consequently adversely influences print durability. Therefore, it has been recognized that by using a selective type of crosslinking, latexes can be formed that provide improved thermal jetting characteristics over non-crosslinked latexes, e.g., shear stability, storage stability, ink-performance, etc., and provide acceptable film forming and other print durability properties.

As such, a latex suspension can include a fluid medium and surface-crosslinked latex particulates. The surface-crosslinked latex particulates can be substantially devoid all crosslinking below the particulate surface. Such surface-crosslinked latex particulates can be prepared with a plurality of monomers and crosslinking agent. Latex particulates, as disclosed herein, can be included in an ink-jet ink. In one embodiment, an ink-jet ink can include a colorant, a liquid vehicle, and surface-crosslinked latex particulates.

In another embodiment, a method for crosslinking latex particulates can comprise dispersing latex particulates in a solution, wherein the latex particulates include a plurality of surface reactive groups which have the capacity to react with crosslinking agents, and wherein the latex particulates are substantially non-crosslinked. An additional step includes reacting a plurality of poly-functional compounds with the surface reactive groups of latex particulates in the solution under conditions which encourage bonding of the poly-functional compounds to the surface groups, thereby forming surface-crosslinked latex particulates.

In accordance with these embodiments, various details are provided herein which are applicable to each of the method, ink-jet ink, latex dispersion, etc. Thus, discussion of one specific embodiment is related to and provides support for this discussion in the context of the other related embodiments.

In one aspect, the method can include the step of polymerizing a plurality of monomers to form the latex particulates that are then crosslinked at the surface. In another aspect, the step of dispersing latex particulates can be by forming latex particulates and providing poly-functional compounds in the same suspension after the latex particulates are at least substantially formed. When polymerizing a plurality of monomers to form the latex particulates, some of the monomers can be acidic, which can add to the functionality of the resulting latex particulates. In one embodiment, greater than about 4 wt % of the monomers can be acidic. In a further embodiment, greater than about 7 wt % of the monomers can be acidic. In an alternative embodiment, less than about 10 wt % of the monomers can be acidic.

As discussed above, crosslinking agent can be added to a suspension of latex particulates to cause surface crosslinking. In one embodiment, the crosslinking agent can be added only after complete copolymerization of the monomers. In another embodiment, crosslinking agent can be added just prior to complete copolymerization of the monomers. Just prior to complete copolymerization of the monomers can mean when the polymerization process is determined to be greater than about 70% by weight complete as determined by the weight of the latex particulates. In a further embodiment, crosslinking agent can be added when the polymerization process is greater than about 80%, and further even 90%, by weight complete as determined by the weight of the latex particulates.

In typical crosslinking processes, small quantities of crosslinking agent are used during the polymerization. Because of the small quantity of crosslinking agent, the resulting latex particle does not always show uniformity of crosslinking, and is often very dependent on the types of monomers used. In the present process, however, the crosslinking is independent of the type of monomers or their reactivity. As such, monomers can be chosen from a wide variety of monomers that are commercially available.

In accordance with embodiments of the present invention, latex particulates can be formed as is customary in the art. For example, latex formation can be by polymerization of monomers. One example includes the polymerization of the monomers methyl methacrylate and hexyl acrylate with a small amount of hydroxyethyl methacrylate to form normal latex particles in an emulsion process. Other monomers that can be used include methyl acrylate, ethyl methacrylate, ethyl acrylate, butyl methacrylate, butyl acrylate, hexyl methacrylate, 2-ethylhexyl methacrylate, 2-ethylhexyl acrylate, isobutyl methacrylate, isobutyl acrylate, octyl methacrylate, lauryl methacrylate, dodecyl methacrylate and/or styrene. Acid monomers such as acrylic acid, methacrylic acid, itaconic acid, fumaric acid and/or maleic acid can also be included in amounts about 1 wt % to about 15 wt % along with the above mentioned hydrophobic monomers and can provide stability to the particle. Alternatively, latex particulates can be purchased or otherwise obtained which have already been formed.

Once the latex particles are formed (or are nearly completely formed), the surface can be crosslinked in accordance with embodiments of the present invention. In one embodiment, the surface crosslinking can be configured to deform upon printing onto a print media. Without being bound by any particular theory, the deformation may relate to breaking or otherwise modifying the crosslinking bonds or crosslinking compounds.

Crosslinking agents that can be used in the present invention include any chemical compound that includes more than one functional group, e.g. poly-functional compounds. Non-limiting examples of poly-functional compounds can include polyaldehydes, polyepoxides, polyamines, polyisocyanates, and mixtures thereof. Crosslinking agent can be of one type of poly-functional compound. For example, the crosslinking agent can be polyamines (of one or a plurality of different types). Alternatively, multiple different types of crosslinking agents can also be used. Further, the crosslinking agent can comprise or consist essentially of one type of poly-functional compound group, e.g., ethylenediamine. Crosslinking agents can be used in weight ratios of poly-functional compounds to latex particulates in ranges from about 1:5 to about 1:5000.

Further, the concentration of crosslinking agent and the rate of addition of these crosslinking agents can be controlled. Specifically, the rate of addition and the concentration can be optimized for each system so as to control inter-particle crosslinking. In one embodiment, the incorporation of the crosslinking agent into the reaction mixture can be controlled in such a manner that there will be substantially no inter-particle crosslinking. The inter-particle crosslinking can lead to unwanted aggregation.

The resulting surface-crosslinked latex particulates can vary in size. When used in a latex suspension, the particle size can affect the viscosity, and thus the overall performance of the suspension. The viscosity of a suspension is a particular concern in ink-jet printing. In one embodiment, the surface-crosslinked latex particulates can have an average particle size of from about 100 nm to about 500 nm. In a further embodiment, the particle size can be from about 150 nm to about 300 nm. In another embodiment, the average particle size can be around 200 nm.

The preparation of latex particulates in accordance with embodiments of the present invention can result in a latex emulsion having latex particulates of an average molecular weight from 10,000 Mw to 5,000,000 Mw. Further, though generally random copolymers described herein, various types of polymers can be formed, including block copolymers, homopolymers, randomly assembled copolymers, or the like.

A latex suspension can be created using such surface-crosslinked latex particulates. The latex particulates can be dispersed in a fluid medium to create a latex suspension. Therefore, a latex suspension can include a fluid medium and surface-crosslinked latex particulates, where the surface-crosslinked latex particulates have substantially no crosslinking below the surface of the particulates. One specialized type of a latex suspension is an ink. Particularly, an ink-jet ink can include a liquid vehicle, a colorant, and surface-crosslinked latex particulates. The surface-crosslinked latex particulates can be present in the ink formulation in an amount of about 1 wt % to about 50 wt %. In one specific embodiment, the surface-crosslinked latex particulates can be present in the ink formulation from about 2 wt % to about 20 wt %.

As stated previously, ink-jet inks that can be prepared and used in accordance with embodiments of the present invention can include a liquid vehicle, a colorant, and surface-crosslinked latex particulates. However, it should be noted that the surface-crosslinked latex particulates can be jetted as an overcoat to an ink printed on a media substrate. For example, if no colorant is used in an ink, the latex can be admixed with other components to form an ink-jettable colorless solution or dispersion which can be applied as a protective coating material. In this embodiment, typically, an ink-jet ink can be jetted onto a substrate to produce an image, and the ink-jettable colorless solution can be overprinted with respect to the printed image for protection. In one of either of these embodiments, the colorant can be a dye or a pigment, such as a cyan, magenta, yellow, black, orange, pink, blue, gray, etc., dye or pigment. Further, the colorant can be present in the ink-jet ink at from 1 wt % to 10 wt %, or any incremental range therein.

The surface-crosslinked latex particulates of the present invention are particularly useful with pigment based systems. If a pigment is used, the pigment can be a standard pigment that is dispersed by another chemical additive, or can be a self-dispersed pigment having a chemical group covalently attached or physically attached to the surface thereof. Examples of such physical attachment or chemical tethering can be through hydrophobic-hydrophilic attraction, ionic association, covalent bonding, physical adsorption, or other known attachment mechanism. The pigment can be of any color, and the present invention embodiments are not limited to specific pigments. Further, the pigments can be neutral, cationic, anionic, hydrophilic, and/or hydrophobic, without limitation.

Examples of black pigments that can be used include carbon pigments. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. Such carbon pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

A wide variety of colored pigments can be used with the present invention, therefore the following listing is not intended to be limiting. The following color pigments are available from Cabot Corp.: CABO-JET 250C, CABO-JET 260M, and CABO-JET 270Y. The following color pigments are available from BASF Corp.: PALIOGEN Orange, HELIOGEN Blue L 6901F, HELIOGEN Blue NBD 7010, HELIOGEN Blue K 7090, HELIOGEN Blue L 7101F, PALIOGEN Blue L 6470, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, Hostaperme Orange GR, HOSTAPERM Scarlet GO, and Permanent Rubine F6B. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow.

Examples of dispersant polymers that can be used include water-soluble polymeric resin(s), as long as the resin(s) function to stabilize and/or disperse the pigment in solution (attached or unattached). A polymeric resin that can be used includes those having a weight average molecular weight in a range of 1,000 Mw to 30,000 Mw, or any incremental range therein. For example, in a more detailed embodiment, the polymer can have a weight average molecular weight in a range from 3,000 Mw to 10,000 Mw. Specifically, the resin can be a polymer, block copolymer, tri-block copolymer, graft copolymer, random copolymer, or the like. Additionally, the polymer can include one or more monomers with characteristics such as hydrophilic, hydrophobic, neutral, cationic, anionic, amphoteric, and combinations thereof. Exemplary monomers that can be used to form such polymers and copolymers include, without limitation, styrene, styrene derivatives, vinylnaphthalene, vinylnaphthalene derivatives, aliphatic alcohol esters, of α-, β-ethylenically unsaturated carboxylic acids, acrylic acid, acrylic acid derivatives, maleic acid, maleic acid derivatives, itaconic acid, itaconic acid derivatives, fumaric acid and fumaric acid derivative, and the like, and combinations thereof.

Examples of suitable anionic dyes include a large number of water-soluble acid and direct dyes. Specific examples of anionic dyes include Direct Yellow 86, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof, and the like. This list is intended to be merely exemplary, and should not be considered limiting.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

The water-soluble organic solvents and/or co-solvents that can be used in the present invention include, but are not limited to, dimethylformamide, dimethylacetamide, acetone, tetrahydrofuran, dioxane, polyethylene glycol, polypropylene glycol, ethylene glycol, propylene glycol, butylene glycol, 1,2-hexanediol, triethylene glycol, 1,2,6-hexanetriol, thiodiglycol, hexylene glycol, diethylene glycol, ethylene glycol methyl ether, diethylene glycol monomethyl ether, triethylene glycol monomethyl ether, ethanol isopropyl alcohol, n-butyl alcohol, isobutyl alcohol, glycerol, n-methyl-2-pyrrolidone, 1,3-dimethylimidazolidinone, triethanolamine, sulfolane, dimethyl sulfoxide, and the like, as well as other amines, ketones, ethers, polyalkylene glycols, alkylene glycols, lower alkyl ethers of polyhydric alcohols, monohydric alcohols, and combinations thereof.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The liquid vehicle can also comprise solution characteristic modifiers such as viscosity modifiers, pH adjusters, preservatives, various types of surfactant, antioxidants, and evaporation accelerators. Examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethyl betaine, and lauryldi hydroxyethylbetaine; and combinations thereof. Fluorosurfactants can also be used such as those previously known in the art.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, latex particulates, UV curable materials, plasticizers, pigments (other than the colorant), etc.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Synthesis of N-Hydroxysuccinimido Methacrylate (Monomer with Functional Group for Subsequent Crosslinking)

27.5 g of N-hydroxysuccinimide was dissolved in 200 mL of dichloromethane and mixed with 34 mL of triethylamine. The mixture was cooled with ice under nitrogen atmosphere. To the mixture, 21 mL of acryloyl chloride was added dropwise over a period of 1 hour. The mixture was stirred at ambient temperature for 16 hours and then washed three times: first with water, then with sodium bicarbonate, and again with water. This process effectively removed water soluble materials. The organic layer was dried over anhydrous sodium sulfate and filtered. The solvent from the filtered solution was removed to obtain N-hydroxysuccinimido methacrylate.

Example 2

Synthesis of Latex

The monomer of Example 1, N-hydroxysuccinimido methacrylate (1.6 g), was emulsified along with the monomers hexyl methacrylate (76 g) and methacrylic acid (2.4 g) in 34 mL of water containing 30% Rhodafac RS 710. An initiator solution was prepared by dissolving 0.348 g of potassium persulfate in 40 mL of water. Meanwhile 290 mL of water was heated to 90° C. Then the initiator solution was added over a span of 23 minutes. After 3 minutes into the addition of the initiator solution, the emulsion addition was started and the total addition spanned 20 minutes. The reaction mixture was maintained at 90° C. for 2 hours and then cooled. The pH of the solution was adjusted to 7 and filtered to obtain the latex with N-hydroxysuccinimido methacrylate. The particle size of the latex was 125 nm, and was not crosslinked.

Example 3

Crosslinking of Latex

A portion of the latex created in Example 2 was stirred well. To the solution, 250 mg of ethylenediamine was added. The solution was heated to 90° C. for 1 hour. The solution was cooled. This process created surface-crosslinked latex particulates, where the ethylenediamine reacted at the surface of the latex with the functional groups provided by the N-hydroxysuccinimido methacrylate monomer.

Example 4

Shear Stability Testing

Shear stability testing was performed by placing latex suspension in a blender at high speed for 5 min at 60° C. In such testing, the particle size change is an indication whether the polymer passes in the test or not. If aggregation or significant size change occurs, then the polymer is considered to fail. On the other hand, if the polymer remains stably suspended without much change in size, then it is considered to pass. The latex of Example 2 (non-crosslinked) was compared to the latex of Example 3 (surface-crosslinked) in a shear stability test. The surface-crosslinked latex passed the test (particle size change of less than 10%) and showed superior shear stability, whereas the non-crosslinked latex failed the test. Further, it is noted that though the surface-crosslinked latex has surface crosslinking groups, the film-formation properties are similar to those that are not crosslinked at all, e.g., Example 2.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A latex suspension, comprising a fluid medium and surface-crosslinked latex particulates dispersed in the fluid medium to form a colorless dispersion, wherein said latex particulates are prepared with a plurality of monomers and at least one crosslinking agent, wherein the at least one crosslinking agent is added only after complete copolymerization of the plurality of monomers to increase a glass transition temperature at surfaces of the latex particulates, and wherein the surface-crosslinked latex particulates are devoid of the crosslinking agent below their surfaces so that the glass transition temperature below the surface is less than the glass transition temperature at the surface.

2. The latex suspension of claim 1, wherein the at least one crosslinking agent includes at least one di-functional compound.

3. The latex suspension of claim 1, wherein the at least one crosslinking agent includes at least one tri-functional compound.

4. The latex suspension of claim 1, wherein the at least one crosslinking agent is selected from the group consisting of polyaldehyde, polyepoxide, polyamine, polyisocyanate, and mixtures thereof.

5. The latex suspension of claim 1, wherein at least about 4 wt % of the monomers are acidic.

6. The latex suspension of claim 1, wherein at least about 7 wt % of the monomers are acidic.

7. The latex suspension of claim 1, wherein there is no inter-particle crosslinking.

8. The latex suspension of claim 1, wherein the surface-crosslinked latex particulates have an average particle size from about 100 nm to about 500 nm.

9. A method for crosslinking latex particulates to form the latex dispersion of claim 1, comprising: dispersing latex particulates in a solution, wherein the latex particulates include a plurality of surface functional groups; and reacting the crosslinking agent in the form of a poly-functional compound with the surface functional groups in the solution under conditions which encourage bonding of the poly-functional compound to the surface groups, thereby forming the surface-crosslinked latex particulates.

10. The method of claim 9, wherein the step of dispersing includes polymerizing the plurality of monomers to form the latex particulates.

11. The method of claim 10, wherein greater than about 7 wt % of the monomers are acidic.

12. The method of claim 9, wherein the surface-crosslinked latex particulates have an average particle size of from about 100 nm to about 500 nm.

13. The method of claim 9, wherein the weight ratio of the poly-functional compound to the latex particulates range from about 1:5 to about 1:5000.

14. The latex suspension of claim 1, wherein the surface-crosslinked latex particulates are formed by copolymerizing the plurality of monomers to form a single polymer, then adding the crosslinking agent after complete copolymerization of the plurality of monomers.

* * * * *